(12) United States Patent
Petrak

(10) Patent No.: US 6,350,713 B1
(45) Date of Patent: *Feb. 26, 2002

(54) CERAMIC MATRIX COMPOSITES

(75) Inventor: Daniel Ralph Petrak, Sanford, MI (US)

(73) Assignee: Dow Corning Corporation, Midland, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,979

(22) Filed: Nov. 24, 1998

(51) Int. Cl.$^7$ .................. C04B 35/80; C04B 35/571
(52) U.S. Cl. .................. 501/95.2; 501/88; 501/92; 501/96.4; 428/366; 428/378; 428/396; 428/392
(58) Field of Search .................. 501/92, 95.1, 95.2, 501/96.4, 88; 428/366, 378, 396, 392

(56) References Cited

U.S. PATENT DOCUMENTS

| | | | | |
|---|---|---|---|---|
| 4,642,271 A | | 2/1987 | Rice ........................... 428/698 |
| 4,944,904 A | * | 7/1990 | Singh et al. .................. 269/60 |
| 5,015,540 A | * | 5/1991 | Borom et al. ................ 428/366 |
| 5,021,367 A | * | 6/1991 | Singh et al. .................. 501/88 |
| 5,198,302 A | | 3/1993 | Chyung et al. ............. 428/375 |
| 5,202,059 A | | 4/1993 | Kennedy ................ 252/389.31 |
| 5,275,984 A | * | 1/1994 | Carpenter et al. ......... 501/95.2 |
| 5,354,602 A | | 10/1994 | Stranford et al. ........... 428/220 |
| 5,447,893 A | | 9/1995 | Zank ............................ 501/87 |
| 5,580,643 A | | 12/1996 | Kennedy et al. ............ 428/212 |
| 5,593,728 A | * | 1/1997 | Moore et al. .............. 501/95.2 |
| 5,707,471 A | | 1/1998 | Petrak et al. ................. 156/89 |
| 5,866,244 A | * | 2/1999 | Jessen ....................... 501/95.1 |
| 5,952,100 A | * | 9/1999 | Corman et al. ............. 428/378 |
| 5,962,103 A | * | 10/1999 | Luthra et al. ............... 428/107 |

OTHER PUBLICATIONS

Sun et al., "Fiber Coatings For SiC–Fiber–Reinforced BMAS Glass–Ceramic Composites", Journal of the American Ceramic Society, Jan. 1997, vol. 80, No. I, pp. 264–266.
Bansal et al., "Tensile Strenght and Microstructural Characterization of HPZ Ceramic Fibers", Mater. Sci. Eng., 1997, pp. 149–157, Abstract, No Month.
A Chemical Vapor Deposition (CVD) BN–Si3N4 Interfacial Coating for Improved Oxidation Resistance of SiC–SiC Composites; Journal of MaterialsSynthesis and Processing, vol. 3, No. 2, 1995, pp. 121–131.

* cited by examiner

*Primary Examiner*—Karl Group
(74) *Attorney, Agent, or Firm*—Sharon K. Severance

(57) ABSTRACT

This invention pertains to ceramic matrix composites that comprise the coated ceramic fibers wherein the coating comprises at least one binary coating of boron nitride (BN) and silicon nitride ($Si_3N_4$) within ceramic matrices derived from curable preceramic polymers. The composites can be formed into complex shapes which have good oxidation resistance at high temperature, good resistance to moisture high flexural strength and are resistant to moisture.

8 Claims, 2 Drawing Sheets

Fig.1 Interlaminar Shear Strength Before and After Rain/ETC Exposure

Interlaminar Shear Strength Before and After Rain/ETC Exposure

CERAMIC MATRIX COMPOSITES

FIELD OF THE INVENTION

This invention pertains to ceramic matrix composites that comprise ceramic fibers coated with at least one binary coating comprised of boron nitride (BN) and silicon nitride ($Si_3N_4$) within ceramic matrix. The ceramic matrix is derived from curable preceramic polymers. The composites can be formed into complex shapes which have good oxidation resistance at high temperature, high flexural strength and are resistant to moisture.

BACKGROUND OF THE INVENTION

It is well known that for ceramic matrix composites, interfacial bonding between the reinforcing fiber and matrix controls the mechanical properties of the composite. In many ceramic matrix composites reinforced with silicon-oxycarbide fibers, carbon coatings on the fiber have been shown to control interfacial bonding between fiber and matrix to produce desired mechanical properties. It is possible to apply the carbon coating to the fiber before fabricating the composite, or to process the composite for short durations at approximately 1000° C. under non-oxidizing conditions to produce a thin carbon layer on the fiber.

Unfortunately, the use of these ceramic matrix composites in high temperature (>500° C.), oxidizing environments tends to degrade strength and strain tolerance. In some cases it has been shown that the use of BN coatings in place of the carbon coating between the fiber and the matrix substantially improves the oxidative stability of the ceramic matrix composite. For example, U.S. Pat. No. 4,642,271 to Rice discloses a ceramic fiber composite material comprised of boron nitride (BN) coated ceramic fibers embedded in a ceramic matrix. U.S. Pat. No. 5,198,302 discloses silicon nitride reinforcing fibers provided with a protective surface coating comprising a BN base layer and optionally an alumina overcoating. U.S. Pat. No. 5,354,602 to Stranford et al. discloses the use of BN coated fibers in a matrix of black glass ceramic. U.S. Pat. No. 5,707,471 to Petrak et al., discloses the fibers coated with carbon, boron nitride, silicon carbide, silicon nitride, aluminum nitride and combinations of these.

It has now been found that ceramic matrix composites, with polymer derived matrices, that use BN coated fibers are susceptible to moisture corrosion at low temperatures ($\leq 100°$ C.).

U.S. Pat. Nos. 5,580,643 and 5,202,059 disclose duplex coated ceramic filler materials wherein the filler material may be a fiber and the coatings are boron nitride (BN) and silicon carbide (SiC). However, this duplex coating does not provide the benefits of this invention, including the moisture resistance.

Kowbel et al. in "A Chemical Vapor Deposition (CVD) BN-$Si_3N_4$ Interfacial Coating for Improved Oxidation Resistance of SiC-SiC Composites", Journal of Materials Synthesis and Processing, Vol. 3, No. 2 (1995) pp. 121–131 disclose the use of a mixture of BN and $Si_3N_4$ to coat SiC fibers. However, as can be seen in FIG. 11, these composites have about the same flexural strength as a BN coated fiber.

It is an object of this to provide ceramic matrix composites which contain coated fibers wherein the coating comprises at least one binary layer comprised of boron nitride and silicon nitride.

SUMMARY OF THE INVENTION

This invention pertains to a ceramic matrix composite comprising a ceramic fiber coated with at least one binary coating comprised of boron nitride (BN) and silicon nitride ($Si_3N_4$). The ceramic matrix composites containing the coated fibers maintain flexural strength when exposed to moisture.

DETAILED DESCRIPTION OF THE INVENTION

Figure 1:
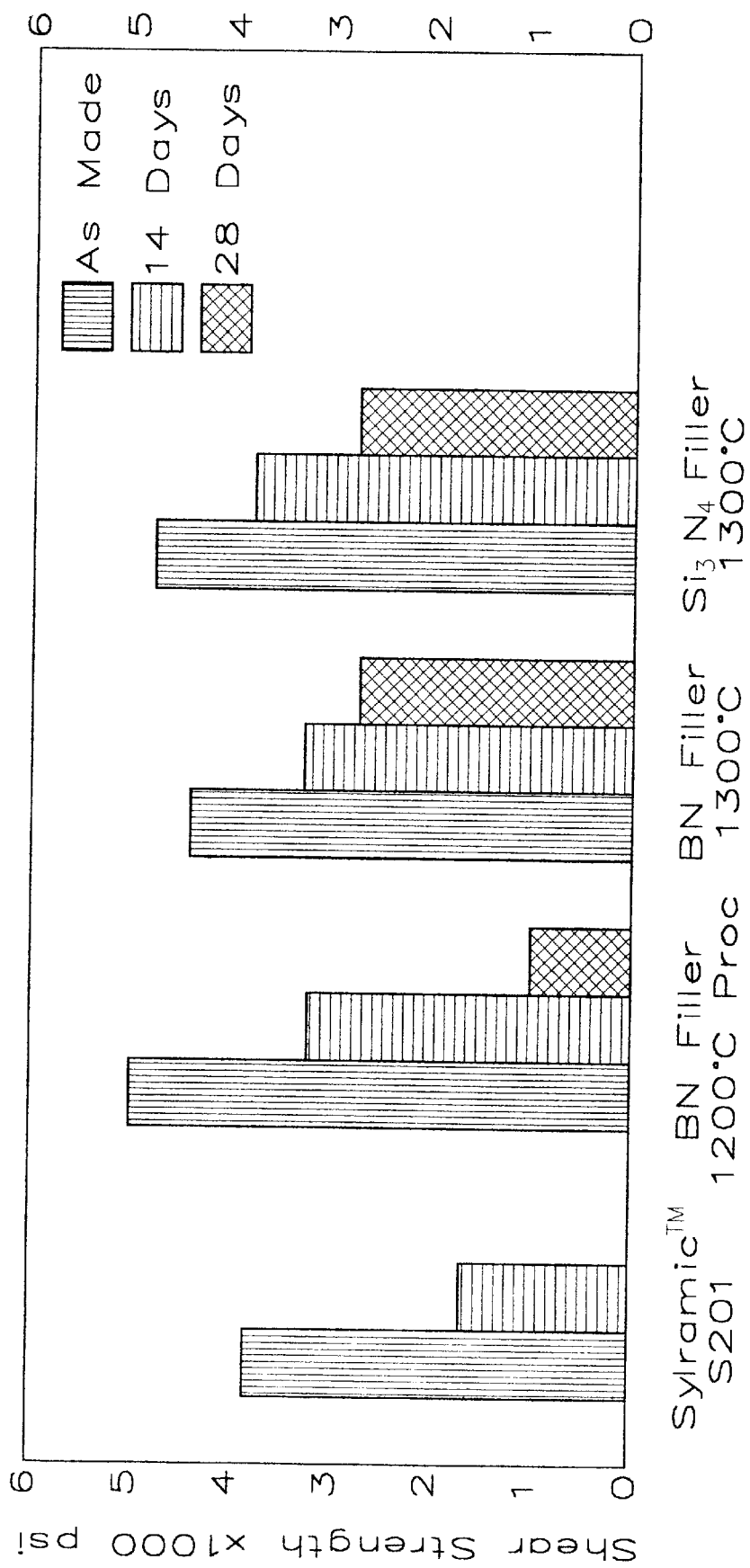
FIG. 1 represents a bar chart representation of the interlaminar shear strength of ceramic matrix composites containing a fiber having a BN interfacial coating before and after rain/engine thermal cycle exposure.

This invention pertains to matrix composites comprising ceramic fibers having coated thereon at least one binary layered coating comprised of boron nitride (BN) and silicon nitride ($Si_3N_4$). The ceramic fibers which may be used in this invention comprise high-modulus fibers which are compatible with the coatings and matrices described herein and which can withstand the polymer inpregnation process. These fibers are well known in the art and many are commercially available. Examples of suitable fibers include those of silicon carbide, silicon nitride, silicon carbide deposited on a carbon core, aluminum borate, aluminum oxide, silicon oxide, silicon carbide containing titanium, silicon oxycarbides, silicon oxycarbonitrides, carbon and the like. Generally, such fibers should have a modulus of greater than 100 GPa, preferably greater than 150 GPa. These fibers may contain any desirable number of filaments per tow and have a diameter in the range of about 5 $\mu$m to about 500 $\mu$m.

Examples of specific fibers include, but are not limited to, silicon carbide fibers with a diameter in the range of 10–20 $\mu$m manufactured by Nippon Carbon (Nicalon®); fibers comprising silicon carbide deposited on a carbon core with a diameter of about 143 $\mu$m manufactured by Avco; alumina-boria-silica fibers with a diameter of about 10–12 $\mu$m manufactured by 3M; $Al_2O_3$ fibers with a diameter of about 20 $\mu$m manufactured by DuPont; $SiO_2$ fibers with a diameter of about 8–10 $\mu$m manufactured by J. P. Stevens; $Al_2O_3$—$SiO_2$ fibers with a diameter in the range of about 9–17 micrometers manufactured by Sumitomo; silicon carbide fibers containing titanium with a diameter in the range of 8–10 $\mu$m manufactured by Ube (Tyranno®); silicon carbide fiber with a diameter in the range of 6–10 $\mu$m manufactured by Avco; silicon oxycarbonitride fibers with a diameter in the range of about 10–15 $\mu$m; silicon carbide fibers with a diameter in the range of about 10–15 $\mu$m manufacture by Dow Corning (Sylaramic™); silicon nitride fibers such as those produced by Tonen or Rhone Poulanc and $Al_2O_3$—$ZrO_2$ fibers with a diameter of about 20 $\mu$m manufactured by DuPont. These commercial fibers may be supplied with a surface sizing. It is preferable to remove the sizing prior to the application of the coating.

Although any of the above fibers are functional, those preferred herein comprise ceramic fibers of silicon and carbon and optionally oxygen. Especially preferred are silicon oxycarbide fibers (Nicalon® and Tyranno®) and silicon carbide fibers (Nicalon® and Sylramic™).

The ceramic fibers are coated with at least one binary coating comprised of boron nitride and silicon nitride. The binary coating is applied to the ceramic fiber by first applying a layer of boron nitride onto the ceramic fiber followed by the application of a coating of silicon nitride over the boron nitride coating. Additional binary coatings of boron nitride and silicon nitride may be applied to the ceramic fiber in the same manner. However, it is preferred to produce a fiber having one binary coating of boron nitride and silicon nitride. Each individual coating thickness (BN or $Si_3N_4$) is typically in the range of 0.02 to 1 μm, preferably from 0.05 to 0.3 μm. The coatings may be deposited by any means known in the art such as chemical vapor deposition or by coating with polymer precursors followed by pyrolysis.

Optionally, additional coatings may be applied over a single binary coating of $BN/Si_3N_4$ or between multiple layers of the binary coating (i.e. over the $Si_3N_4$ but under the next $BN/Si_3N_4$ coating). These additional coatings may be any known interface coating such as coatings of carbon, silicon carbide, and aluminum nitride, preferably silicon carbide.

Preferably the coatings are applied by chemical vapor deposition techniques. For example, boron trichloride and ammonia are heated to a temperature of 980° C. to 1000° C. at a pressure in the range of 0.2 torr to 1.0 torr to produce the boron nitride coating. To produce the silicon nitride coating, silicon tetrachloride and ammonia are used at the same deposition conditions. By products are removed from the deposition system down stream and away from the coated fiber.

The coated fibers may be used in nearly any length and may be arranged in the matrix in nearly any manner desired. Generally, the fibers are essentially continuous and are either aligned unidirectionally, woven as a 2-dimensional fabric or shaped as a 3-dimensional reinforced preform. It is preferable to heat the coated fiber to about 1100° C. to 1300° C., preferably about 1200° C., prior to its use in preparing the composite. Preferably the fiber is heated under atmospheric pressure in a nitrogen environment in a carbon lined furnace.

The matrices are derived from curable preceramic polymers. The expression "curable" is used herein to describe polymers which can be deep section infusibilized (cured) in the composite under moderate conditions by means such as mild heat, radiation, curing catalysts, or curing agents. This curability prevents the composite from delaminating during pyrolysis.

Any curable preceramic polymer may be used in the present invention. Preferable curable preceramic polymers are organosilicon polymers selected from the group consisting of polysiloxanes, polysilazanes, polysilanes, polycarbosilanes, polysilsesquioxanes, polymetallosiloxanes and others, preferably polysilazanes. These curable organosilicon preceramic polymers are well known in the art and are described in U.S. Pat. Nos. 5,447,893 and 5,707,471 to Petrak et al., commonly owned, herein incorporated by reference for the teaching of curable organosilicon preceramic polymers. Suitable polysilazanes include, but are not limited to hydridopolysilazanes, silacyclobutasilazanes, boron modified hydridopolysilazanes and vinyl-modified hydridopolysilazanes.

In addition to above fibers and curable preceramic polymers, the composites may also contain fillers. Suitable fillers are known in the art and may be exemplified by, but not limited to, powders, whiskers or particulates of metal oxides such as $Al_2O_3$, $SiO_2$, silicon carbide, silicon nitride, silicon hexaboride, aluminum nitride, boron nitride, boron carbide, titanium boride, boron, titanium carbide, aluminum nitride and others. The preferred fillers are boron nitride, silicon carbide and silicon nitride. Such fillers are generally included in amounts up to about 65 volume percent based on the volume of the matrix material, preferably from 5 to 50 volume percent.

The composites herein may be produced by polymer impregnation. This process comprises first impregnating the coated fibers with a liquid preceramic mixture comprising the curable preceramic polymer and optionally, fillers. The preceramic mixture can be formed by either a solution or melt route.

In the solution route, the curable preceramic polymer and fillers are mixed in an organic solvent. The preferred solvents are those with a low vaporization point, preferably <125° C., at atmospheric pressure to facilitate removal from the impregnated fibers and those with less than about 1 wt % water. Examples of suitable organic solvents include aliphatic hydrocarbons such as hexane, heptane and others and aromatic hydrocarbons such as benzene, toluene and others. The concentration of curable preceramic polymer in solution can be varied over a wide range with higher concentrations generally resulting in larger amounts of the preceramic polymer impregnating the fiber. Preferably, concentrations in the range of about 20 to about 60 weight percent are employed herein.

In the melt route, the curable preceramic polymer is heated to a temperature above its melting point yet below its curing temperature in an inert environment. Fillers may also be mixed in the molten polymer if desired.

The coated fibers are then impregnated with the preceramic mixture by any convenient means. For instance, the fibers can be immersed in the mixture, sprayed with the mixture, held under a stream of the mixture and others. The impregnated fibers can additionally be manipulated to uniformly distribute the matrix mixture in the fibers. Following impregnation, any excess matrix mixture on the fibers is allowed to drain off.

If the solution route to the preceramic mixture is used, the solvent is allowed to evaporate. Generally, any practical method such as air evaporation at room temperature or the use of vacuum or mild heat may be used. The resultant fibers which have been impregnated and the solvent evaporated are commonly called a "pre-preg".

If the melt route to the preceramic mixture is used, the impregnated fibers can merely be cooled to form the "prepreg". Alternatively, however, the melt impregnated fibers may be formed prior to cooling by a process such as filament winding or pulltrusion. When these fibers are cooled, they can be immediately cured and fired as set forth below.

The pre-preg is subjected to externally applied pressure while heating to form the composite into the desired shape and cause uniformity of resin and the coated fibers. Generally, this is accomplished by pressing the pre-preg into a mold at a temperature and pressure which allows the resin to flow throughout the mold. The pressing conditions generally used therein include temperatures in the range of about 150° C. to about 300° C., pressures in the range of about 6.9 to 6,900 kPa (1 to 1000 psi), and times in the range of about 30 minutes to about 15 hours. Pressing at about 175° C. to 230° C., 1380 to 2760 kPa (200–400 psi) and 6 to 15 hours generally provides satisfactory results. Temperatures and pressure which result in resin being forced out of the mold should be avoided.

It should be noted that if a 3-dimensional (3-D) shape is desired, the above steps are often altered. To manufacture 3-D objects by this process, one generally first forms the coated fiber into the desired shape and then impregnates the formed coated fiber with the polymer mixture. The impregnated fibers are then pressed, cured, and fired as set forth herein.

The formed pre-preg is next infusibilized (cured) to insure complete or nearly complete crosslinking such that deformation on pyrolysis will not occur. Any method which produces the desired result may be used so long as the temperature does not cause ceramification. A preferred method comprises heating at 250° C. to 300° C. for up to 16 hours, preferably for 2 to 16 hours. This infusibilization (curing) step may be performed in the mold under pressure or it may be accomplished in a conventional oven under nitrogen without any applied pressure.

The pressed and cured product (green composite or molded part) is then fired in a furnace to a temperature of at least 1000° C. in an inert atmosphere until the product ceramifies. It is preferred that the green composite be fired at a temperature of about 1200° C. to 1300° C. Preferably, the cured product is slow fired wherein the composite is heated in a slow (e.g. 2° C./min.), stepwise, linear fashion until the majority of any higher boiling volatiles present escape the composite after which time the temperature can be quickly raised to the ultimate firing temperature.

After completion of the firing process the composite is cooled to <100° C. When cooled, the resulting material is uniform, hard, strong fiber reinforced composite. The volume percentage of coated fibers in the resulting composite can vary over a wide range depending on the desired use. Generally, it is preferred that about 10 to 65 vol % of the composite is fiber.

The composites formed by the above process are generally quite porous. Since it may be preferred to produce dense objects, the composites may be reimpregnated and pyrolyzed until the desired density is achieve. This is accomplished by merely impregnating the composite with the curable preceramic polymer (without filler) as describe above (e.g. solution route or melt route), curing the reimpregnated composite and then firing. This reimpregnation process is then repeated until a composite with the desired density and strength is achieved.

The composites produced herein have many desirable properties such as high flexural strength, good oxidation resistance at high temperatures, high strength and toughness, a wide range of dielectric properties and moisture resistance (as measured by retention of flexural strength and/or shear strength after exposure to moisture).

So that those skilled in the art can understand and appreciate the invention taught herein, the following examples are presented, it being understood that these examples should not be used to limit the scope of this invention found in the claims.

EXAMPLES

Example 1

Comparative

Matrix Precursor Formulation

The matrix precursor was prepared by mixing the filler powder (Table 1) with a boro hydridopolysilazane polymer (Boro-HPZ) in toluene. In each case the filler and Boro-HPZ (i.e. solids) was 50% of the slurry by weight. When BN was used as the filler it was 20% of the solids. When SiC powder was used as the filler, it was 25% of the solids. Mixing of the matrix slurry was done by ball milling the total mixture for two hours in a plastic jar with 0.25 inch diameter SiC balls. The plastic jar was 500 cm volume and 200 g of SiC balls were used during the mixing operation. The total weight of the slurry produced was 150 g.

Prepreg Preparation

The preparation of prepreg was done by pouring the matrix slurry over the coated cloth and gently rubbing the slurry into the woven cloth to assure penetration of the slurry into the fiber tows. The saturated cloth was then run through a set of metal rolls to remove excess matrix precursor. The piece of cloth was then suspended in a hood to evaporate the toluene solvent. After typically one hour, the prepreg was drapeable and slightly tacky. At that stage, the solids content of the matrix precursor was 40 to 50% of the weight of the prepreg total.

Preparation of unidirectional tape was done by dripping the matrix slurry on the coated fiber tape which was wound on a one meter diameter drum. This was done while using a rotating drum which tended to spread the slurry uniformly over the tape. The tape had previously been wound to carefully place a monolayer of fiber tow on the drum.

After the solvent was evaporated, approximately one hour, the rotating drum was stopped and the tape was removed by cutting one time to create an impregnated tape approximately 3.14 meters long. The tape is then ready for laying-up into a composite.

Composite Molding Procedure

The procedure to mold the composites was to cut the prepreg cloth test specimens into approximately 16.5 cm×16.5 cm pieces. Eight pieces (plies) of prepreg were cut using a razor knife. The plies were stacked as warp direction aligned symmetrical eight ply composites in the case of woven cloth composites. Most typically an 8 harness satin weave cloth was used for these composites. The satin weave produces high volume fraction fiber compared to plain weave.

In the case of composites formed by the use of prepreg ini-tapes, the tapes were stacked as either one direction reinforced composites or 0/90 lay-up where the direction of the tapes were alternating. The 0/90 architectures were also stacked to be symmetrical about a mid-plane.

Once the prepreg plies were stacked they were ready for vacuum bagging. This consisted of an aluminum plate 30 cm×50 cm, one layer of peel ply, the stack of prepreg plies, another peel ply, a second 18cm×18 cm aluminum plate and a sheet of Vac-Pac UHT-650-XT bonded to the larger aluminum plate using a high temperature tape (Schnee-Morehead 5158). A vacuum port and breather fabric were introduced through the Vac-Pac sheet.

Molding was done by placing the cull plate and vacuum bag in a warm molding press that was preheated to 120° C. The vacuum bag was loaded to produce a stress on the stack of plies of 689.5 MPa (100 psi). The conditions of 120° C. and 689.5 MPa (100 psi) were maintained for 30 minutes. The temperature was then increased to 180° C. for one hour and raised again to 260° C. for 2 hours. The pressure was raised to 1034 MPa (150 psi) during the 260° C./2 hour hold. The press was cooled and the pressure was allowed to slowly release due to cooling the press.

The composites were then weighed and checked for dimensions. Excess resin that was squeezed from the plies was removed from the edge of the panel. A 20 hour post-cure cycle was also completed by heating to 285° C. in a nitrogen atmosphere.

Pyrolysis and Composite Densification

The post-cured composite panels were heated in a furnace with a nitrogen atmosphere to 1000° C. at 100° C. per hour. The temperature was held for one hour. The temperature was then raised to 1200° C. in one hour and held for 2 hours. After cooling to less than 100° C. the panels were removed from the furnace and inspected. Typically, the panels would not change dimensions but the composite would loose approximately 9% of its weight.

That weight loss produced approximately 30% open porosity in the pyrolyzed composite. In order to reduce the open porosity, the composite panels were then impregnated with a 50% solution of HPZ polymer in toluene. The impregnation was done at room temperature by placing the panel in an evacuated chamber and introducing the HPZ solution. Once the part was submerged in the solution, the vacuum was released and the chamber pressure was raised to ambient pressure.

The panels were permitted to remain in the solution for 30 minutes; then they were removed from the solution and placed in an exhaust hood to evaporate the toluene solvent for at least one hour. After the solvent was removed the panel was heated again to 1200° C. in flowing nitrogen using the same heating schedule described above. This reimrpregnation and pyrolysis cycle was repeated until the composites showed an open porosity level that was measured to be 6% or less using a liquid immersion method. As few as 10 or as many as 17 pyrolysis cycles were required to reduce the open porosity to less than six percent.

Five composite panels were fabricated using this process method. They are identified as C1-a, C1-b, C1-c, C1-d and C1-e. All panels were prepared using a Boro-HPZ prepreg resin and CG Nicalon™ fiber reinforcement. But each panel used a different combination of interface coating and filler as shown in Table 1. Panels C1-a through C1-e using CG Nicalon™ fiber in the form of an 8 harness satin woven cloth.

All panels exhibited good three-point flexure strength at room temperature in the as made condition. However, panels 1-a and 1-b, which used a BN interface coating, showed relatively poor flexure strength after being subjected to boiling distilled water for 24 hours. Panels C1-c, C1-d and C1-e had a carbon interface coating and produced better retention of flexure strength than panels C1a and C1b after the 24 hour water boil test. However, it is known that the carbon interface is also susceptible to oxidation at elevated temperatures an therefore would be less effective in structural applications.

TABLE 1

Properties of CG Nicalon ™ Fiber Composites with various filler and interface coatings.

| Example | Fiber Coating | Filler | Flexural Strength, MPa | | |
|---|---|---|---|---|---|
| | | | Before | After | % Retention |
| C1-a | BN | BN | 368.5 | 104.2 | 28.3 |
| C1-b | BN | SiC | 400.2 | 93.8 | 23.4 |
| C1-c | C | BN | 345.0 | 144.9 | 42.0 |
| C1-d | C | None | 387.8 | 317.4 | 81.9 |
| C1-e | C | SiC | 263.6 | 258.1 | 97.7 |

Example 2

Composite panels made from the same matrix and fiber using the same process as described in Example 1 were made with a non-woven fiber architecture and binary interface coatings. Panel 2 was prepared as a 0/90 architecture composite from a unidirectional tape. The interface coating was one binary coating of 0.3 micrometers of BN and 0.2 micrometers of $Si_3N_4$ deposited on the fiber. Table 2 lists the properties of a 12-ply composite that used 20% BN as the matrix filler. Specimen 2-a showed as made average three-point flexure strength to be 431.2 MPa (62.5 ksi). Specimen 2-b was subjected to the 24 hour water boil test as described in Example 1. Speciment 2-b showed an average 3-point flexure strength of 318.1 MPa (46.1 ksi). That level of strength retention after water exposure, 73.4% was substantially improved compared to the BN interfaced coated materials produced in Example 1.

Example 3

Specimens taken from panel 3 were fabricated using a unidirectional tape where all the fibers were aligned in one direction. Otherwise, this panel was processed the same as the panels in Example 1. The interface coating used in panel 3 was six binary coatings of BN and $Si_3N_4$. The total coating thickness though was approximately 0.7 micrometers. This panel also used BN as the matrix filler. As it shown in Table 2, specimens 3-a and 3-b show that the water boil exposure produced improved flexure strength compared to the as made strength. Specimen 3-c demonstrates that this panel retains good four-point flexure strength at 1000° C. in air. The carbon interface composites show rapid reduction in strength when exposed to these test conditions. Specimen 3-c showed relatively good retention of strength in oxidizing conditions.

TABLE 2

CG Nicalon ™ Fiber reinforced composites with Multi-layer Interface Coatings on Non-woven Fiber.

| Example | Bulk Density g/cm³ | Open Porosity % | Flexural Strength, MPa | Comments |
|---|---|---|---|---|
| 2a | 2.10 | 10.8 | 430.6 | 3 pt. RT test as made condition |
| 2b | 2.12 | 10.6 | 318.1 | 3 pt. RT test after 24 H₂O Boil |
| 3a | 2.16 | 2.5 | 478.2 | 3 pt. RT test as made condition |
| 3b | 2.13 | 2.9 | 601.7 | 3 pt RT test after 24 H₂O Boil |
| 3c | 2.14 | 5.4 | 369.8 | 4 pt 1000° C. test (no aging) |

Example 4

Specimens prepared in Example 4 were molded using 8 harness satin woven cloth. The processing was done in a manner similar to Example 1 except that the molding thermal cycle also included a higher temperature cure step of 300° C. for 4 hours. In addition, some of the panels were also subjected to a one-time thermal treatment at the fourteenth or fifteenth pyrolysis cycle to 1300° C.

Table 3 lists the filler type, the number of pyrolysis cycles used to density the composite panels and a designation for the interface coating. A description of the "Mods" is listed in Table 4. Table 3 also lists four point flexure strengths in the as made connection, at 1100° C. and after heating specimens at 1100° C. for 50 h in air.

The asterick (*) specimens listed in Table 3 were panels prepared with a combined unitape and 8 harness satin woven cloth architecture. The plies of the composite were 0/90/0/ 8HS/8HS/8HS/8HS/0/90/0. This symmetrical architecture used three tape plies on the outsides of four plies of 8 harness satin woven cloth.

Samples F, G and J–M are for comparison. In general, the multi-layer interface coatings perform as well as or better than the BN or BN/SiC interface coated specimens in flexure tests.

TABLE 4

Description of various binary interface coatings

Mod 1 = 1 binary coating of 0.3 μm BN, 0.2 μm $Si_3N_4$
Mod 2 = 2 binary coatings of 0.05 μm BN, 0.05 μm $Si_3N_4$
Mod 3 = 2 binary coatings of 0.05 μm BN, 0.05 μm SiC
Mod 4 = 5 binary coatings of 0.02 μm BN, 0.02 μm $Si_3N_4$

Example 5

Panels prepared as in Example 4 were subjected to interlaminar shear strength tests before and after a rain and simulated engine thermal cycle exposure for fourteen and twenty-eight days. This combined exposure to water and thermal stress evaluates the durability of CMC parts for some aerospace applications. The test consisted of tensile fatigue of specimens to 69 MPa (10 ksi) at room temperature at $10^4$ fatigue cycles prior to the rain exposure. Specimens were then subjected to simulated rain at the rate of 0.254 cm per day (approximately 2 minutes). After the rain simulation, specimens were stored at 90° F. and 90% relative humidity for approximately 22 hours and then subjected to a simulated Engine Thermal Cycle (see Table 5).

Figure 2:
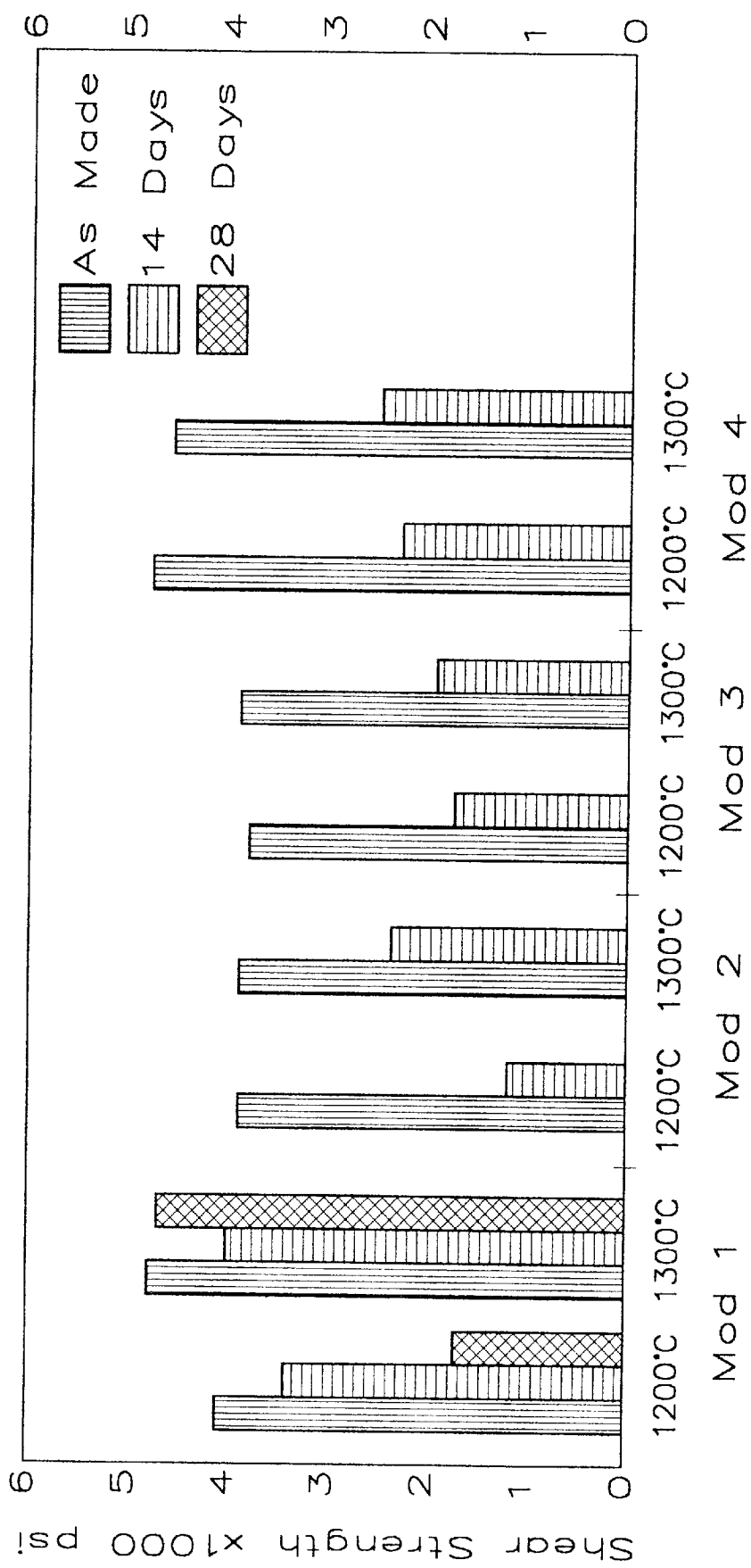
FIG. 2 represents a bar chart representation of the interlaminar shear strength of ceramic matrix composites containing a fiber having an interfacial coating of this invention before and after rain/engine thermal cycle exposure.

The results are shown in FIGS. 1 and 2. FIG. 1 shows the results for fibers coated with only BN. FIG. 2 shows the results for fibers with the various MOD coatings.

TABLE 5

Engine Thermal Cycle

| Time (min) | Temperature (° C.) |
| --- | --- |
| 4 | 135 |
| 1 | 925 |
| 17 | 450 |
| 3 | 925 |
| 5 | 450 |
| 2 | 925 |
| 4 | 450 |
| 26 | 290 |
| 8 | 135 |
| end cycle | room temp. |

TABLE 3

Process and Properties of CG Nicalon ™ Fiber Reinforced Ceramic Matrix Composites

| | | | # Cycles Densifi-cation | Process Temp ° C. | Four Pt Flexural Strength, MPa | | |
| --- | --- | --- | --- | --- | --- | --- | --- |
| Sample | Interface | Filler | | | Room Temp. | @ 1100° C. | R.T. after 50 h at 1100° C. |
| A | Mod 1 | $Si_3N_4$ | 15 | 1200 | 594.8 | 531.3 | 618.2 |
| B | Mod 1 | $Si_3N_4$ | 17 | 1300 | 492.9 | 480.2 | 487.8 |
| C | Mod 2 | $Si_3N_4$ | 17 | 1300 | 443.0 | 546.5 | 468.5 |
| D | Mod 2 | $Si_3N_4$ | 17 | 1200* | 464.4 | 572.0 | 474.0 |
| B | Mod 2 | $Si_3N_4$ | 17 | 1300* | 499.6 | 565.1 | 464.4 |
| F | Mod 3 | $Si_3N_4$ | 15 | 1200 | 339.5 | 394.0 | 457.5 |
| G | Mod 3 | $Si_3N_4$ | 17 | 1300 | 323.6 | 402.3 | 391.2 |
| H | Mod 4 | $Si_3N_4$ | 15 | 1200 | 373.3 | 356.0 | 347.8 |
| I | Mod 4 | $Si_3N_4$ | 17 | 1300 | 411.9 | 527.8 | 478.2 |
| J | BN | BN | 15 | 1200 | 389.8 | 426.4 | 573.4 |
| K | BN | BN | 17 | 1300 | 349.8 | 393.3 | 496.8 |
| L | BN | $Si_3N_4$ | 15 | 1200 | 348.4 | 436.8 | 364.3 |
| L | BN | $Si_3N_4$ | 17 | 1300 | 280.1 | 267.7 | 479.6 |
| M | BN | None | 17 | 1300 | 248.4 | 285.0 | 193.9 |

*Indicates combined Uni- and woven fiber architecture

What is claimed is:

1. A ceramic composite comprising a ceramic matrix having within the ceramic matrix a ceramic fiber coated with at lease one binary coating of boron nitride and silicon nitride wherein the silicon nitride is applied over the boron nitride;

wherein the ceramic fiber is comprised of silicon, oxygen and carbon and wherein the ceramic matrix is produced from a preceramic composition comprising a curable ceramic polymer selected from the group consisting of polysiloxanes, polysilazanes, polysilanes, polycarbosilanes, polysilsesquioxanes and polymetallosiloxanes.

2. A ceramic composite as claimed in claim 1 wherein the silicon nitride coating has a thickness of 0.1 to 1 μm.

3. A ceramic composite as claimed in claim 1 wherein the fiber is comprised of silicon and carbon.

4. A ceramic composite as claimed in claim 1 wherein the fiber is comprised of silicon, carbon and oxygen.

5. The ceramic composite of claim 1 wherein the curable preceramic polymer is a polysilazane selected from the group consisting of hydridopolysilazanes, silacyclobutasilazanes, boron modified hydridopolysilazanes and vinyl-modified hydridopolysilazanes.

6. The ceramic composite of claim 1 wherein about 10 to 65 percent by volume of the composite comprises fiber.

7. The ceramic composite of claim 1 wherein the preceramic composition additionally comprises fillers.

8. The ceramic composite of claim 7 wherein the fillers are selected from the group consisting of $Al_2O_3$, $SiO_2$, boron nitride, silicon carbide, silicon nitride, silicon hexaboride, boron carbide, titanium boride, boron, titanium carbide and aluminum nitride.

* * * * *